US007002559B2

(12) United States Patent
Ericson

(10) Patent No.: US 7,002,559 B2
(45) Date of Patent: Feb. 21, 2006

(54) METHOD, SYSTEM AND PRODUCT FOR INFORMATION MANAGEMENT

(75) Inventor: Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 612 days.

(21) Appl. No.: 09/987,188

(22) Filed: Nov. 13, 2001

(65) Prior Publication Data

US 2002/0056576 A1 May 16, 2002

Related U.S. Application Data

(60) Provisional application No. 60/261,122, filed on Jan. 12, 2001.

(30) Foreign Application Priority Data

Nov. 13, 2000 (SE) .................................... 0004156

(51) Int. Cl.
*G06G 5/00* (2006.01)

(52) U.S. Cl. .................... 345/179; 178/18.01; 382/188

(58) Field of Classification Search ................ 345/156, 345/179, 173, 174, 175, 176, 177, 178; 178/18.01–18.11; 382/188, 313, 314

See application file for complete search history.

(56) References Cited

U.S. PATENT DOCUMENTS

| | | | | |
|---|---|---|---|---|
| 5,652,412 | A | 7/1997 | Lazzouni et al. | |
| 5,852,434 | A | 12/1998 | Sekendur | |
| 6,182,086 | B1 | 1/2001 | Lomet et al. | |
| 6,330,976 | B1 * | 12/2001 | Dymetman et al. | 235/487 |
| 6,627,870 | B1 * | 9/2003 | Lapstun et al. | 250/221 |
| 6,681,045 | B1 * | 1/2004 | Lapstun et al. | 382/187 |
| 6,808,330 | B1 * | 10/2004 | Lapstun et al. | 401/45 |

FOREIGN PATENT DOCUMENTS

| | | |
|---|---|---|
| EP | 0737922 | 10/1996 |
| GB | 2306669 | 5/1997 |
| KR | 2001-029046 | 4/2001 |
| WO | WO 99/44134 | 9/1999 |
| WO | 99/50751 | 10/1999 |
| WO | 99/50787 | 10/1999 |
| WO | 00/72110 A2 | 11/2000 |
| WO | 00/72244 A1 | 11/2000 |
| WO | WO 01/16691 | 3/2001 |

* cited by examiner

*Primary Examiner*—Dennis-Doon Chow
(74) *Attorney, Agent, or Firm*—Birch, Stewart, Kolasch & Birch, LLP

(57) ABSTRACT

A method, a system and a product for managing information uses of an absolute position-coding pattern formed of marks positioned on one or more products. The coordinates of the marks define an imaginary surface, which includes all marks which the absolute position-coding pattern has the capacity to code. The imaginary surface is divided into at least two regions, the coordinates of which can be separated from each other. The information is generated by passing a sensor device over the marks on the product and reading the absolute coordinates of the position of the sensor device. Reading of coordinates from the first region results in a information management function of the sensor device, such as a send function, and reading of coordinates from the second region forms message information.

36 Claims, 9 Drawing Sheets

METHOD, SYSTEM AND PRODUCT FOR INFORMATION MANAGEMENT

CROSS-REFERENCE TO RELATED APPLICATIONS

This application claims priority under 35 U.S.C. §119 of U.S. Provisional Application No. 60/261,122, entitled Method, System and Product for Information Management, filed Jan. 12, 2001, the disclosure of which is expressly incorporated herein by reference in its entirety. This application also claims priority under 35 U.S.C. §119 of Swedish Patent Application No. 0004156-6, filed Nov. 13, 2000.

FIELD OF THE INVENTION

The present invention generally relates to the field of communications, and, more particularly, to a method, system and product for information management.

BACKGROUND INFORMATION

Information is frequently recorded and communicated with pen and paper. Such paper-bound information, however, is difficult to manage and communicate efficiently. Computers are used to an increasing extent for communicating and managing information. Such computer-based information is typically inputted via a keyboard and stored in the memory of the computer, for instance on a hard disk. The inputting of information via a keyboard, however, is slow and typing errors are frequent. Although many utility programs exist, such as word division programs, to facilitate computer inputting, it is not very convenient to read large amounts of text on a display. When information is available in the computer, however, it can easily be communicated to others, such as by e-mail or SMS (short message service) via an Internet connection or as a fax via a fax modem.

Patent Application PCT/SE00/01895, filed by the applicant, discloses a system in which a pen and a sheet of paper are used to take down information in the traditional manner, while at the same time a digital graph is formed of several traces or strokes by movement of the pen over the sheet of paper, such that the graph can be transferred to a computer. Such a system combines the advantage of handling pen and paper, which many users are accustomed to, with the computer's superior capability of communicating and storing information. The paper is provided with a coding pattern, for instance consisting of points or marks. The pen has an optical sensor which records the coding pattern and, with a mathematical algorithm, calculates the position of the pen on the coding pattern.

The traditional pen will in this way be an excellent input device for the computer, and the computer can be used to store the information instead of filing sheets of paper. Moreover, the information can easily be communicated by means of the computer. The disadvantage of this method of inputting is that the information is graphical and not in character format, to which the computer is adapted.

However, the information included in the graph contains additional information which can be used for various purposes. Specifically:

1) The information comprises an image, such as figures or lines that are related to each other and which can be interpreted by a human being, such as letters, a symbol, a figure or drawing. This is the actual message which is taken down and which the user wants to manage in one way or another, for instance file the message or send it to a recipient. This information is referred to herein as message information and is stored in a graphical format, for instance in a vector format or as a collection of pixels.

2) The part of the message information which consists of letters (handwritten) can be subjected to subsequent processing in the form of optical character recognition (OCR) or intelligent character recognition for conversion into a character format which can be used by the computer, for instance for search purposes or cataloguing. Also, symbols can be interpreted, for instance shorthand symbols or icons, which the user predefines to have a specific meaning. This information is referred to herein as character information.

3) The information may further comprise an identification of the pen which is used to take down the information. The identification of the pen is referred to herein as the pen ID.

4) Finally, the graph contains information about where on the surface the graph was taken down, so-called absolute position information. As described in detail below, the present invention relates to a number of services or applications based on the absolute position information.

There are previously known systems for obtaining absolute position information (see for instance U.S. Pat. No. 5,852,434). These previously known systems, however, only disclose the use of such information to form message information, i.e., group 1) above.

The information can be processed at different points in the system. The pen thus comprises: an image sensor; a processor; associated memory; and a battery. Moreover, the pen comprises a communication unit, such as a cord for connecting to a computer or an IR link or short range radio link for communication with the computer. The pen also includes a pressure sensor which records whether the pen point is in touch with a base. The pressure sensor can also detect the pressure by which the pen point is pressed against the base.

Even if it is possible to transfer the information from the pen to an external computer in the form of the video image which is reproduced by the sensor and all computer processing then takes place in the computer, it is preferred that the pen be provided with a processor and some image processing capability. Thus, the pen includes a processor or logic which processes the obtained video image and calculates the positions of the marks on the sensor's reproduction of the surface of the sheet of paper. This image processing includes adjusting for perspective effects caused by rotation and inclination of the pen relative to the paper, and compensating for different light conditions. Preferably, the pen also comprises a computer program which, with the aid of algorithms, calculates the x-y coordinates of the pen. It is thus made possible for the pen to perform different functions based on the values of the coordinates, as will be explained in more detail below.

The information is thus stored first in the memory of the pen, in the form of a sequence of coordinates which can easily be converted into vectors. This message information in vector form can be transferred to a computer which executes a program to output a graph on the computer display. The message information can also be sent to a printer to be printed immediately or to a dumb display which only has the function of drawing the graph on a display, such as a TV screen. Interpretation of the message information into character format can take place either in the pen or in the computer.

It may be desirable to communicate message information to a recipient, for instance in the form of a fax or an e-mail. The pen can cooperate with a mobile phone, by means of a cord, IR radiation or a radio link. The mobile phone essentially functions as a "modem" to link the message information to a fax number, or to the Internet by calling a modem pool of an Internet operator. In this case, it is in some cases necessary for part of the message information to be subjected to character recognition, preferably in the pen, and to be used as a telephone number or an IP address for communication via the Internet. Alternatively, an address function in the mobile phone can be used.

Of course, the computer may act as a "modem" as well and in that case character recognition can take place in the computer, which may often have better processor capacity than what is provided in the pen. In certain cases, communication via the Internet can first take place to a server at an IP address preprogrammed in the pen (or the mobile phone), where character recognition can take place.

SUMMARY OF THE INVENTION

An object of the present invention is to use the absolute position information which is obtained in a system as described above in order to facilitate information management.

In a system according to one implementation of the present invention, use is made of a code pattern which is interpreted by the pen as coordinates (x,y) on a surface. By the sensor detecting points or marks which are located within a partial surface containing, for example, 6*6 points and each point being able to code 4 different values, for instance the coordinates (0,0); (1,0); (0,1); and (1,1), $4^{36}$ possible coordinates are obtained. If each point corresponds to a surface of 0.3*0.3 $mm^2$, the surface will be $1.5*10^{15}$ $m^2$.

The position code makes up a total surface which is dependent on the pattern and the properties thereof. This total surface can be divided into regions which in turn can be subdivided into areas, which in turn can be subdivided into subareas, referred to herein as atoms. By determining which region, area and atom the pen detects, the message information can be managed in different ways.

Thus, the present invention concerns a method and a device for managing information, based on use of an absolute position-coding pattern, which includes marks located on one or more products. The coordinates of the marks define an imaginary surface, which includes all marks which the absolute position-coding pattern has the capacity to code. The imaginary surface is divided into at least two regions where the coordinates of the regions are separable from each other. The information is generated by passing a sensor device over the marks on the product and reading the absolute coordinates of the position of the sensor device. According to the invention, coordinates from a first region result in a function of the sensor device, such as a send function, and coordinates from a second region form message information. The function can be one of the functions of storing information, sending information and converting information.

In one implementation of the present invention, the function is a send function, the sensor device sending coordinates from a send area of the above-mentioned first region to a database device, which allocates a particular send address to the send area, which is used to send message information to a recipient. In this manner, the send area can be allocated to certain users which will have access to the functions which the invention can perform.

Moreover, it is convenient for the send address to be communicated to the sensor device, which sends a request to a computer device defined by the send address to start a program in said computer device. In this way, the database device need only keep track of the send address while the other functions are defined and performed by the computer device which can be a personal computer or a server in a local network or on the Internet.

Thus the program analyzes the coordinates in the second region and sends a request to the sensor device to transfer the message information, the program generating a message according to this information. The program can generate an e-mail, which is sent to a recipient, or an SMS. The e-mail address can be included in the message information. Alternatively, the program generates a function for performing a service, such as purchase of a product, sending of a brochure or similar electronic commerce.

Additional aspects of the invention will be defined in more detail below in the appended claims. Other objects, features and advantages of the invention will be evident from the following detailed description of the invention with reference to embodiments of the invention as illustrated in the drawings.

DETAILED DESCRIPTION OF EMBODIMENTS OF THE INVENTION

Figure 1:
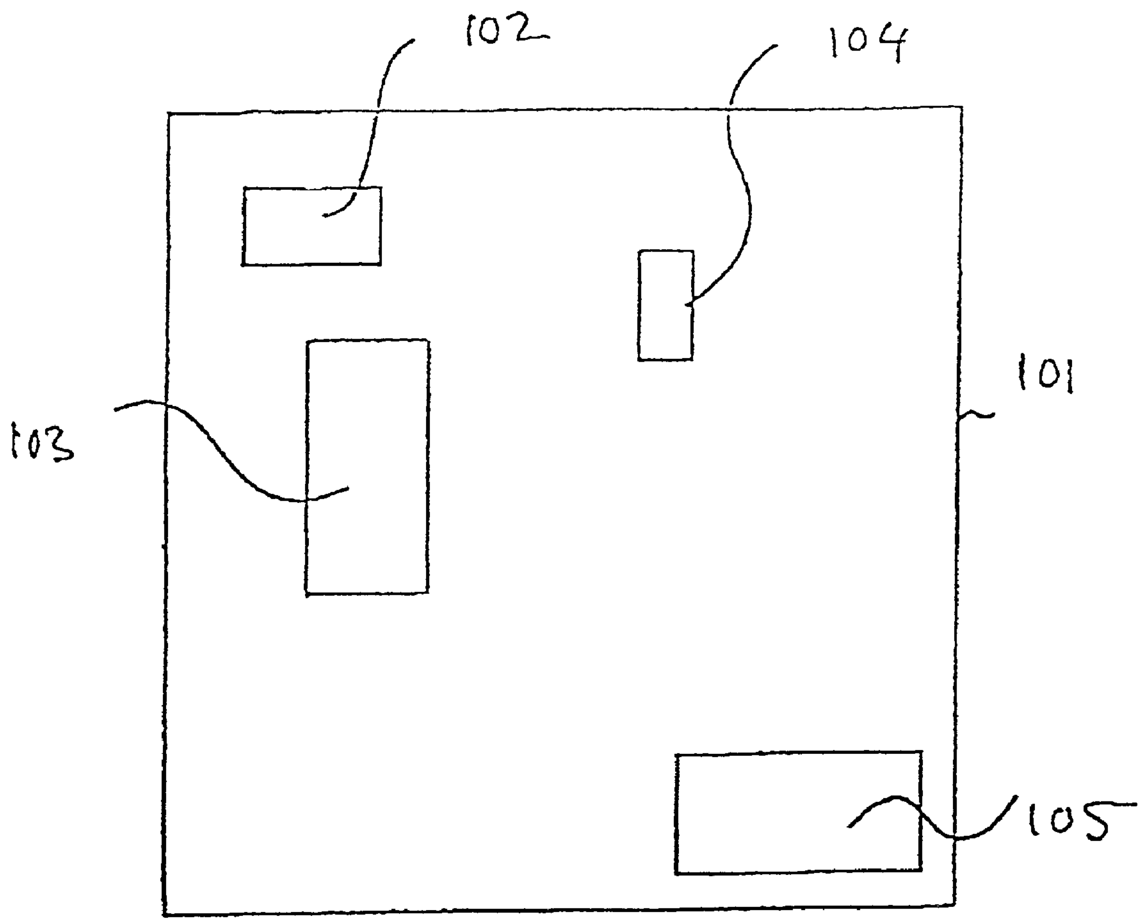
FIG. 1 is a schematic diagram illustrating a first imaginary surface with different areas dedicated to different tasks.
Figure 2:
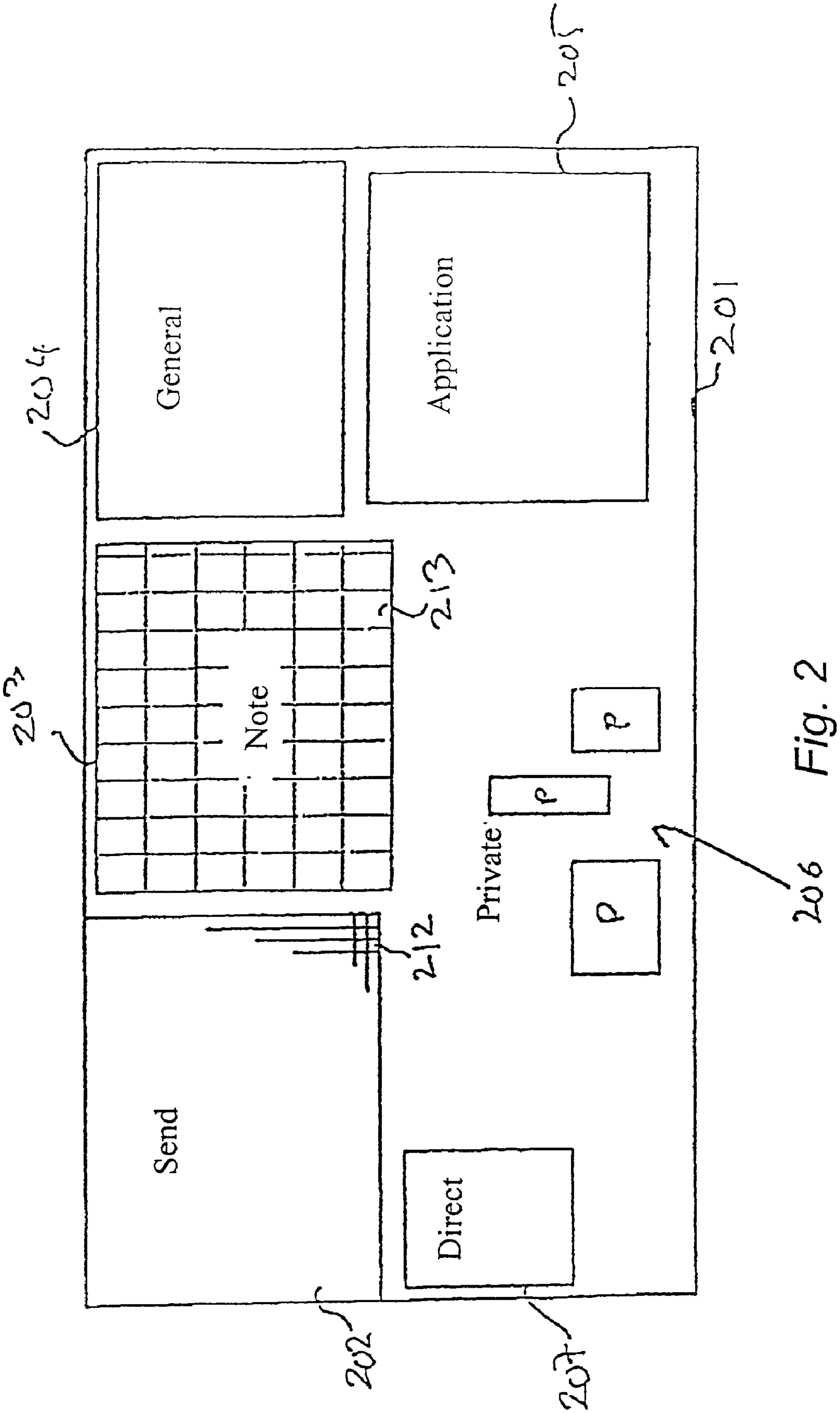
FIG. 2 is a schematic diagram illustrating a second imaginary surface with different areas dedicated to different tasks.
Figure 3:
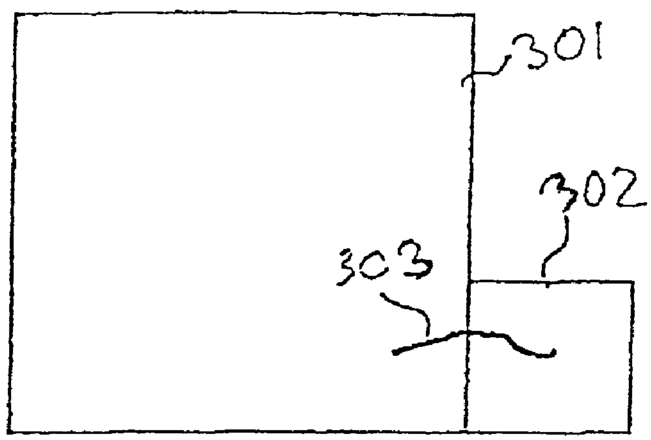
FIGS. 3A–3B illustrate an example of the generating of a command.

With reference to FIGS. 1–3, general principles of an information managing system according to the invention will first be described. Then, with reference to FIGS. 4–9, more specific embodiments will be discussed.

FIG. 1 shows schematically an imaginary surface 101 which is made up by all the points whose absolute coordinates can be coded by an absolute position-coding pattern. The coordinates are suitably given in the form of x-y coordinates calculated by a drawing device or pen, which is used according to the invention.

Four different coordinates areas, or regions, 102–105 are defined on the imaginary surface. The regions have different sizes and different shapes. They are located at varying distances from each other and do not overlap. The layout of regions 102–105 shown in FIG. 1 is merely exemplary, and the relationship between the size of regions 102–105 and the size of the imaginary surface 101 may be quite different from that shown.

The various regions are dedicated to different functions. In this example, the first region 102 is dedicated to recording notes in a notepad, the second region 103 is dedicated to calendar information, i.e., information to be stored and associated with a certain point of time or time interval, the third region 104 is dedicated to recording of handwritten information which is always to be sent to a predetermined server unit on the Internet for optical character recognition, and the fourth region 105 is dedicated to a specific function, such as a send function. The use of such regions 102–105 will be described in more detail below.

In an actual information managing system, the number of dedicated regions can, of course, be much larger, which will be exemplified in connection with the description of FIG. 2.

Particulars about the extent of the imaginary surface and the location and the extent of the various regions which have been dedicated to different information managing purposes or different functions that are to be carried out for information which is managed in the system, are stored, wholly or partly, in one or more computer systems which preferably are an active part of the information managing system, as will be described in more detail below.

As stated above, the information managing system according to the present invention may be based on use of an absolute position-coding pattern. This pattern can be made up in different ways, but for the absolute position-coding pattern to be used to record information at high resolution and also be used in a system that allows highly varied processing of the information, the pattern should be designed in such manner that it can code the coordinates of a very large number of points. Moreover, the absolute position-coding pattern should be coded graphically in a way so as not to interfere with the surface to which it is applied. Finally, the absolute position-coding pattern should be easy to detect so that the coordinates can be determined with high reliability.

An absolute position-coding pattern that satisfies the above-mentioned requirements is disclosed in Patent Application PCT/SE00/01895, which was filed on 2 Oct. 2000, and which is commonly assigned with the present Application.

The absolute position-coding pattern can be applied to all conceivable products on which information is to be recorded by recording of coordinates. The products can be made of different materials, such as paper, plastic, etc. The absolute position-coding pattern can also be integrated into or applied to a computer display. The pattern is suitably applied to paper, which is below referred to as “digital paper.”

An embodiment of a digital pen which can be used to record information in the information managing system according to the invention is shown and described in, for example, the above-mentioned PCT/SE00/01895.

The pen can advantageously contain information which makes it possible for it to distinguish information that is to be stored in the pen, that is to be transferred to the user’s personal computer, that is to be sent to a fax telephone number via a modem or that is to be sent to a server at a predetermined IP address. More specifically, as stated above, a region on the imaginary surface can be dedicated so that information recorded by means of a subset of the absolute position-coding pattern which corresponds to this region and which thus is represented by coordinates of points which are positioned in this area is always to be sent to the IP address for further processing.

The pen or the server can, but thus need not, know to what all the different regions on the imaginary surface are dedicated. In fact, no individual unit in the system needs to know this, but this knowledge can be distributed among a number of different units. However, overall knowledge of which regions are already dedicated and which regions are free should be available for administration of the system. Information about the exact use of a specific region or area may, however, be available only to the one who for the time being has the exclusive right to use the region or area. As an alternative, all information can, of course, be collected in one unit.

Moreover, a basic idea of the present information managing system is that only simple processing, requiring a small amount of time and memory, of the recorded information should take place in the pen. More complicated processing can take place in a computer, with which the pen communicates and in which software for processing of information from the pen is installed and/or in a server which may contain very powerful software for, inter alia, optical character recognition, a greater amount of memory, for instance for database particulars, and faster processors for more advanced processing of the information.

This distribution of processing makes it possible to manufacture pens at a relatively low cost. Furthermore, new applications can be added to the information managing system without necessitating upgrading of existing pens. Alternatively, users may update their pens at regular intervals to obtain particulars about new dedicated regions and about how information which is related to these regions is to be processed.

The information managing system will be illustrated below using a number of application examples. First, this is carried out with reference to a region division according to FIG. 1, followed by a more concrete example with reference to FIGS. 2 and 3. Embodiments in which information exchange takes place between units in an inventive system are then illustrated in connection with FIGS. 4–9.

The applications in an information managing system according to the present invention can be divided into three groups or types: 1) Applications with analog input signal and digital output, 2) Communication applications, and 3) Service applications.

Applications of the first group use the digital pen and the writing surface with an absolute position-coding pattern essentially for inputting information into a computer, a PDA or a mobile phone. This type of application can be carried out by means of other types of pens than those used according to the present invention and using relative position determination, such as pens provided with an accelerometer for determining pen movement.

A product with a writing surface, for example a notepad, can be provided on the actual writing surface with an absolute position-coding pattern retrieved from a first region, in which case this pattern codes coordinates of points within a region, e.g., the region 102 in FIG. 1, which is dedicated to notes. Moreover, the product can be provided with a box having the designation “store” and containing an absolute position-coding pattern from a second region, in which case this pattern codes coordinates of points within a region which is dedicated to functions, for example the region 105 in FIG. 1.

When the user is writing on the writing surface, the pen records a representation of what is being written in the form of a sequence of pairs of coordinates of points within the first region on the imaginary surface by continually recording images of that part of the absolute position-coding pattern which is within the field of vision of the pen. The pen stores these absolute coordinates in a buffer memory in the pen. When the user then places the pen in the box "store" or ticks this box, the pen records coordinates of at least one point within the second region and stores these coordinates in the buffer memory. At the same time the pen notes that these coordinates represent a function. It is precisely this function (which will be explained in more detail below) which corresponds to the fact that information to be stored in a nearby computer is stored in the memory of the pen. As soon as the pen makes contact with the computer with which it is synchronized, the pen transfers the recorded coordinate information to the computer via a radio transceiver integrated in the pen, for instance a Bluetooth unit. The computer stores the received information as an image, which for example can be shown directly on the computer display. A search in the stored information can be effected later based on the time of storing (or the writing) of the information and based on keywords which have been written in block letters on the writing surface and which thus could be stored in character coded format (ASCII) after optical character recognition (OCR). Of course, the pen can be adapted to always transfer the information in its buffer memory to a nearby computer, when being in contact with this computer, i.e., the same function as autosave in a word-processing program.

Another function that can be available in a product of the type described above is, for example, "Address book" which is a box provided with another subset of the absolute position-coding pattern which codes coordinates of points within a region on the imaginary surface which is dedicated to functions. When the pen recognizes the coordinates of this function, it sends address information that has been written by hand, for instance in the form of block letters, in a region, intended for this purpose, of the absolute position-coding pattern to the computer which stores the address information in a digital address book. Different areas or subareas of the region on the imaginary surface can be dedicated to different address particulars.

Information, the content of which needs be interpreted for certain measures to be carried out in the system, is preferably written in block letters in specific areas which are dedicated to character recognition, so-called combs, thereby facilitating the recognition.

The communication applications are somewhat more demanding. In most cases such application also require access to the Internet. Loose sheets, sheets in a calendar, a notepad or the like can be designed as forms for sending graphical e-mail messages, SMS, fax or the like. Fields are printed on the sheet which are intended for indicating address, title and message text. Address and title are intended to be indicated in block letters so that they can easily be converted into character coded format and understood by other digital units which are intended for managing of information in character coded format. The information in the message field may include optional graphical information. The sheet is further provided with a check box which when it is ticked off makes the pen establish contact with the mobile phone with which it is synchronized via a radio link, preferably a Bluetooth link. The message is identified as, for example, a graphical e-mail which is intended for a predetermined server included in the information managing system. The identification can take place by means of information which is stored in the pen or in a unit with which the mobile phone communicates, while the mobile phone preferably only serves as a link or a modem. The mobile phone transfers the message to a base station using GSM or GPRS etc. and then by means of TCP/IP to the predetermined server which decodes the address field and sends the message via the Internet to the addressee. A confirmation of the delivery to the Internet can be shown on the display of the mobile phone.

The above-mentioned sheet can be provided with a subset of the absolute position-coding pattern which codes a region on the imaginary surface which is dedicated to the sending of (graphical) e-mail. Different parts of the region can then represent the various fields and check boxes. Alternatively, the various fields and check boxes can be provided with different subsets of the absolute position-coding pattern coding coordinates of points within areas which are dedicated to address information, indication of title, etc. The advantage of using a specific subset of the absolute position-coding pattern for the check box is that the check box can then be represented by the same subset each time it is being used independently of whether, for instance, a notepad page or an e-mail form is involved. A further advantage is that the decoding in the pen will be easier since the pen only needs to recognize that it is a check box that is ticked off, which means that the pen should take a measure.

The service applications are applications where the managing of information is controlled via one or more predetermined servers. An example is an advertisement in a newspaper which is provided with a subset of the absolute position-coding pattern which codes coordinates of points within a region on the imaginary surface which is dedicated to information to be sent to a predetermined server. It is precisely this subset which codes coordinates of points within a specific subregion of the larger region, to which region the advertiser has obtained the exclusive right. Obviously, there can be larger regions on the imaginary surface which are dedicated to a certain information managing purpose. These regions can then be divided into areas, or subregions, to which different parties can obtain the exclusive right. In the server managing the larger regions, it is then noted which party has the right to the various subregions. Thus, a subset of the absolute position-coding pattern can also enable identification of an owner of the subregion within which the pattern codes points.

In the case of the advertisement, a user can make an order by indicating by means of his or her digital pen a receiving address and ticking off a send box. If the order requires payment, a charge card number can be indicated. If the order concerns a purchase order to the user of the pen, a receiving address need not be indicated, but an address pre-stored for the pen can be used. If the order concerns a gift for another recipient, a handwritten greeting to the recipient can be attached in a writing area for free graphical information in the advertisement.

When the user ticks off the check box, the information is sent in the same way as described above to a predetermined server on the Internet. In the server, the information is decoded. The owner of the area corresponding to the advertisement is determined. Then the decoded information is sent, optionally with the greeting, on a card to the owner, which manages the delivery of the ordered product or service. How the information is sent will be described in detail below.

FIG. 2 schematically shows, similarly to FIG. 1, an imaginary surface 201 which is made up by all the points whose absolute coordinates can be coded by an absolute position-coding pattern. A number of different regions 202–207 are defined on the imaginary surface 201. The regions have different sizes and of different shapes. They can thus be more or less regular in shape, not only rectangular as shown in the example. The regions are positioned at a varying distance from each other and the relationship between their size and the size of the imaginary surface 201 can be quite different from the one shown. The regions need not be separated from each other, as shown in FIG. 2, but may overlap each other and be defined by mathematical relationships.

For the present invention, it is assumed that the total surface has x-y coordinates of the binary type, i.e., ones and zeros, where the coordinates have a length of 36 bits for each x coordinate and y coordinate and thus code a surface of $4^{36}$ positions.

The different regions are dedicated to different functions. In this example, a send region 202 is dedicated to be used in generation of send commands from a pen. The send region can, for example, be defined as all coordinates whose x value begins with 0001 and whose y value begins with 0001. Thus, for example the first four bits in a coordinate indicate region allocation. In this way 256 regions are obtained.

The first four bits generally indicate region allocation and a certain number of the last bits indicate the size of the areas in the region. In the send region, the size of the areas is smallest, a so-called atom, consisting of 64*64 marks or corresponding to the last six bits. With a distance of 0.3 mm between the marks this corresponds to a surface of 19.2*19.2 $mm^2$. The remaining 26 bits (36−4−6) indicate the different send areas in the region. The total number of send areas then is $4^{26}$, i.e., more than 4500 trillion (4,503,599, 627,370,496). For the notice region it is desirable for each area to be larger than an A4 page, for instance about 1 $m^2$, which corresponds to about 12 bits. In this case the number of areas in the notepad region is $4^{20}$, i.e., about 1 trillion (1,099,511,627,776).

The send region has a large number of areas 212. Each area can be defined by a number consisting of the 5th to the 30th bits of the x and y coordinates, respectively. Information about the positions of these areas is preferably not stored in the pen.

These send areas are suitably associated with different recipients in a network which is connected to an information managing system according to the present invention. Information about such allocation is stored in the information managing system. The first four bits thus indicate the region, the following 26 bits the area in the region, and the last six bits indicate where on the send area the pen is located.

The second region 203 is dedicated to notepad information and also comprises a large number of areas 213. Information about the positions of these areas is preferably stored in a computer with which one or more pens communicate, or in the pens themselves, such positions being determined in advance so that all users of the system know in advance that the notes made in these subregions belong to the notepad region 203.

The third region 204 is dedicated to general accessibility. Information about the position of this region is stored in a computer with which one or more pens communicate. No user can reserve any part of this region for his own use. Also, this region can be divided into areas, but users may also themselves determine the sizes of the areas.

The fourth region 205 is, in contrast to the general region 204, dedicated to give users exclusive accessibility, i.e., the areas are assumed to be accessible to only one pen at a time or in the way determined by the user. Information about the position of this region 205 and areas thereof is stored in a computer with which one or more pens communicate. The fact that users can reserve parts of this region for their own use means that collisions are avoided since two or more pens cannot simultaneously use an identical copy of the same part of the printed position-coding pattern which makes up this region, or at least the user is in full control of this.

A large number of private areas in one or more private regions 206 can be regarded as subscription objects, i.e., they can be reserved for a shorter or longer period for a user's pen. Information about the positions of the regions 206 or the private areas can be stored, together with a pen's identity, in a computer, with which one or more pens communicate. In principle each person and each company in the world can have their own private area of a size of 1 $m^2$.

The sixth region 207 is intended to be accessible for local management of communication between a pen and a local computer, without necessarily being in contact with a computer in a network. Information about the position of this region is preferably stored in the pens communicating with the local computer. The position of this region on the imaginary surface 201 can be determined in advance so that all users of the system know in advance that notes made in these subregions are associated with the notepad region 203.

For each of these regions 203–207, or areas within the same, one or more send areas 212 can be allocated. The use of this allocation will now be described with reference to FIGS. 3A–3B.

FIG. 3A shows part of a first area 301, which can be a subset of one of the regions 203–207 illustrated in FIG. 2, close to a send area 302 from a send region, for example the send region 202 in FIG. 2. A pen stroke 303, which can be physically recorded on a product on which the position-coding pattern is printed, has been generated by the pen of a user. The stroke or trace 303 has an extent comprising position-coding patterns from both subareas 301, 302, i.e., the stroke extends over the border between the subareas 301, 302.

Figure 3B:
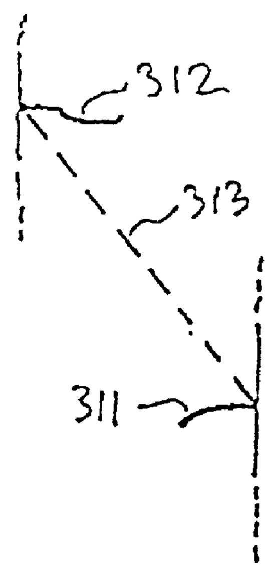

Since the two subareas 301, 302 belong to different regions whose position-coding patterns belong to different locations on the imaginary surface 201, the cross-border pen stroke 303 can be regarded, as shown in FIG. 3B, as two separated strokes 311 and 312. The distance between the first stroke 311 and the second stroke 312 is here illustrated by a dashed line 313 (hyperline) which shows a discontinuity of the coordinates recorded when the mark is made across the border between the two subregions. This discontinuity detection can advantageously be used by the software in the pen or in a computer or server to order or initiate a transmission of certain information from the pen to a receiving unit such as a computer in an information managing system according to the invention or to carry out certain functions or applications, as will be explained in more detail below.

Figure 4:
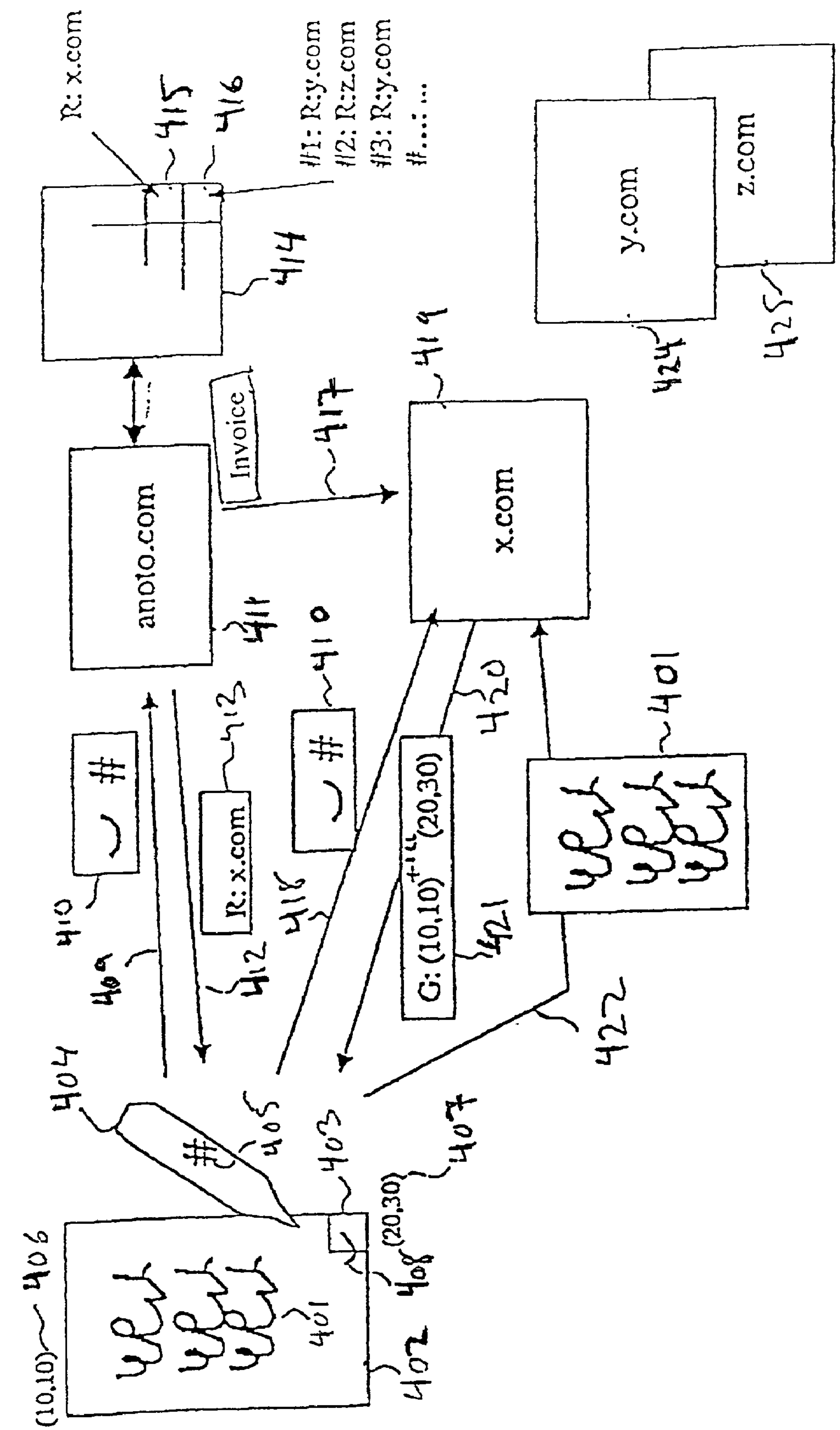
FIG. 4 is a schematic diagram illustrating an example of a general embodiment in which information exchange is carried out between units in an information managing system.

FIG. 4 shows an embodiment of an information exchange which uses an information managing system according to the invention. FIG. 4 shows on the one hand communicating units such as a pen 404 and a first server or computer 411 and, on the other hand, information and signals communicated between the units included in the system.

A pen 404 with a pen ID 405 has been used to generate a message information quantity 401 within a first area 402. The generated information quantity 401 has been stored in the pen 404 according to, for instance, the methods described above in connection with the description of the pen. After the pen 404 has been used to make a send stroke 408 which crosses a border between the first region 402 and a send box 403, a first transfer step 409 is carried out, in which this send stroke 408 is transferred together with the pen ID 405 into a first information packet 410. The transfer takes place to a first computer 411, which receives and analyzes the information from the pen 404. Possibly only the 26 qualifying bits for the send box are transferred, i.e., the bits which define allocation of the send area, with the stroke part 302 in FIG. 3A. The first four bits are in fact obvious since a send function can only be initiated by coordinates from a send region and is used by the pen to initiate the transmission. The last six bits are redundant since it is of no import where in the send box the recording has taken place.

Information 415 about an allocation between the information in the first information packet 410 and an address of a second computer 419 is retrieved from a first database 414. The information packet, or the qualifying bits in the coordinates of the send box, constitutes a pointer to an IP address stored in a database 414 in the computer 411 which preferably is a server on the Internet.

The second computer 419 is preferably one among many service providers which use the first computer 411 as a link to pens of users. The database 414, of course, contains a plurality of such allocations as illustrated with the allocation 416 and the addresses of a number of additional computers 424, 425.

In a first response step 412, the first computer 411 then sends an address reference packet 413 to the pen 404 which is defined by the pen ID in the information packet 410. This address reference packet 413 comprises the reference address which was found in the first database 414 and thus contains information which can then be used by the pen 404 to make contact with the second computer or server 419. Moreover, the first computer 411 can send a charge signal 417 to the second computer 419, which means that the service provider, which is in control of the second computer 419, is requested to pay for the use of the reference service which the first computer 411 has provided. Other ways of charging for this service can, of course, be used, or the service can be free of charge.

In a second transfer step 418, the pen 404 then transfers the first information packet 410 to the second computer 419. In this stage, the essential information is the region and area which the hyperline contains, i.e., the stroke part 303 in FIG. 3A. Also the send area can in some cases be used in the second transfer step. If the transmission comes from a notepad, for example the first 26 bits in the coordinates can be transferred for the stroke part 303 which defines the region (the first four bits) and the particular area in the region (the following 20 bits), while the last 12 bits can be omitted or be set at zero.

In the second computer 419, a computer program is started. Which program is started depends on the received information, e.g., the send area's coordinates or parts of the above-mentioned 26-bit coordinate part in the stroke part 303. The computer program analyzes the received information, for instance the stroke part 303, after which it produces a data request 421 which is sent 420 to the pen 404 which is defined by the pen ID in the information packet 410. This data request may comprise instructions to the pen 404 to produce a data packet with the marks on the position-coding pattern which have been made within a rectangle defined by corner coordinates 406, 407, which can correspond to the entire area defined by the stroke part 303 or specific parts thereof. In the case of a notepad sheet, there is sent a request to send all coordinates defined by the first 24 bits in the stroke part 303, i.e., all notes made on a surface of somewhat more than a square meter. The instructions may also comprise sending only the notes that have been made on this surface after the last synchronization. Moreover the instructions may comprise deleting the notes, that have been sent, from the pen's memory; they are now stored in the computer instead.

The pen executes this request and transfers in a final transfer step 422 the information quantity 401 comprising traces or a graph that has been made within the given rectangle 406, 407. Then the second computer 419 processes this information, for example, according to one of the following specific examples.

Figure 5:
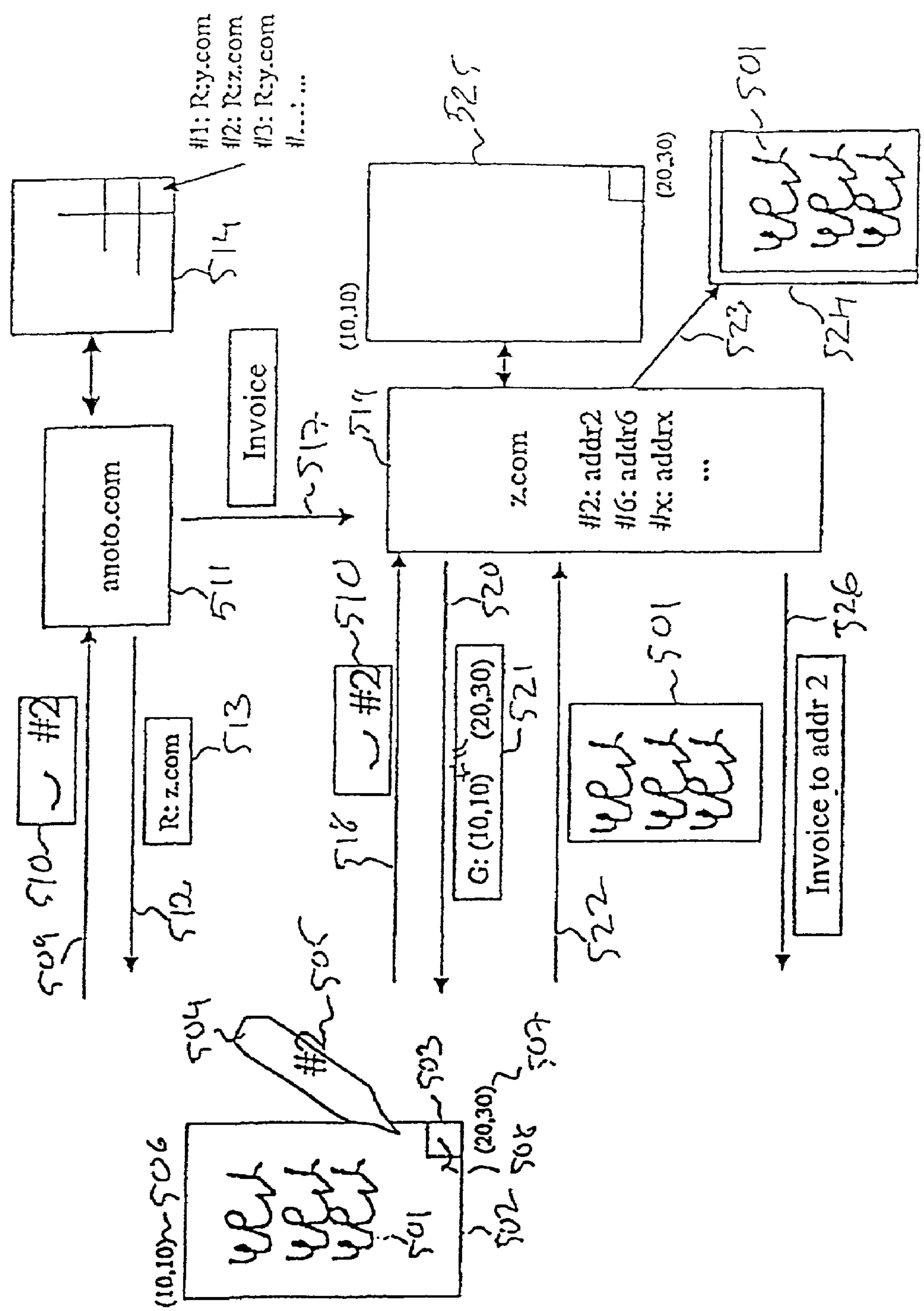
FIG. 5 is a schematic diagram illustrating an example of an embodiment in which information exchange in the form of graphical e-mail is carried out between units in an information managing system.

FIG. 5 shows an embodiment of an information exchange using an information managing system according to the invention. The Figure shows, like in the previous examples, on the one hand communicating units such as a pen 504 and a first computer 511 and, on the other hand, information and signals which are communicated between the units included in the system.

A pen 504 with a pen ID 505 has been used to generate a message information quantity 501 within a first region 502. The generated quantity 501 has been stored in the pen 504 according to, for example, the methods that have been described above in connection with the description of the pen. After the pen 504 has been used to make a send stroke 508 which crosses a border between the first area 502 and the send area 503, a first transfer step 509 is executed, in which this send stroke 508 is transferred together with the pen ID 505 in a first information packet 510, in the same way as described above. The transfer takes place to a first computer or server 511, which receives and analyzes the information from the pen 504.

In the same way as in the previous examples, information about allocation between the information in the first information packet 510 and an address of a second computer 519 is retrieved from a first database 514. The second computer 519 in this example is a service provider which uses the first computer 511 as a link to users' pens and which provides an e-mail service communicating e-mail messages, in particular graphical e-mails.

In a first response step 512, the first computer 511 then sends an address reference packet 513 to the pen 504. This address reference packet 513 comprises the allocation that has been made by means of the first database 514 and thus contains information which the pen 504 can then use to make contact with the second computer 519. In addition, the first computer 511 now sends a charge signal 517 to the second computer 519, which means that the service provider who is in control of the second computer 519 is requested to pay for the use of the reference service provided by the first computer 511.

In a second transfer step 518, the pen 504 then transfers the first information packet 510 to the second computer 519 in the manner described above. The second computer 519 analyzes the information received. In this case, the send box can be of a type that starts an e-mail transmission program which produces a data request 521 that is sent 520 to the pen 504. This data request simply comprises instructions for the pen 504 to produce a data packet with the marks on the position-coding pattern that have been made within a rectangle defined by corner coordinates 506, 507, which can be a notepad sheet in a notepad as stated above.

The pen executes this request and transfers in a transfer step 522 the amount of marks 501 which comprises marks that have been made within the given rectangle 506, 507.

Subsequently the second computer 519 processes this information so that a graphical e-mail message, comprising at least a subset of the amount of marks 501, can be sent to a recipient. Most e-mail programs today have the possibility of attaching an image to an e-mail. This characteristic is used to form the graphical e-mail, which is transferred to the recipient's e-mail system in the usual manner. Alternatively, the information in the pen is converted into an e-mail packet which is sent directly to the recipient. The computer program also interprets an e-mail address which is noted in a specific area into character format for use as an address. This interpretation can also take place in the pen.

The e-mail address can be stated explicitly in an address area, a so-called comb, intended for optical character recognition. Alternatively, the address can be implicit, for instance if an individual writes with his pen on a recipient's business card, provided with the recipient's specific personal area, the program can look up in the first computer who the recipient is, based on the coordinates of the pattern of the business card, and send the mail to the business card holder with a copy to the pen holder. A further alternative is to use e-mail addresses which are prestored in a mobile phone or PDA, with which the pen communicates, or in a specific server available via the Internet. A similar transfer is used in connection with a fax message.

Figure 6:
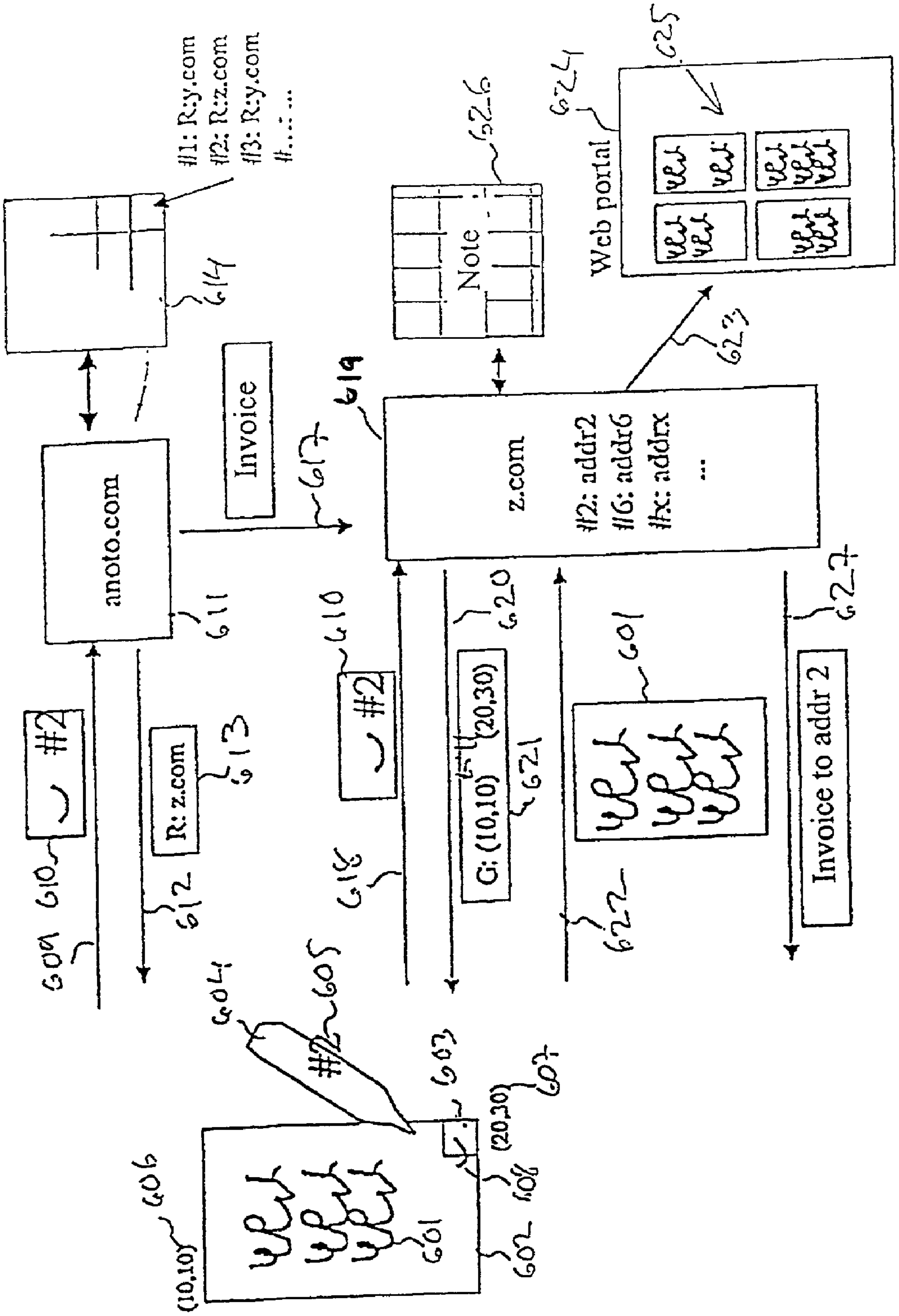
FIG. 6 is a schematic diagram illustrating an example of an embodiment in which information exchange in the form of notes is carried out between units in an information managing system.

FIG. 6 illustrates an embodiment of a transfer of information, using an information managing system according to the invention. The Figure shows, like in the previous examples, on the one hand communicating units such as a pen 604 and a first computer or server 611 and, on the other hand, information and signals that are communicated between the units included in the system.

A pen 604 with a pen ID 605 has been used to generate a message information quantity 601 in a first area 602. The generated quantity 601 has been stored in the pen 604 according to, for example, the methods described above in connection with the description of the pen.

After the pen 604 has been used to make a send stroke 608 which crosses a border between the first area 602 and the send area 603, a first transfer step 609 is carried out, in which this send stroke 608 is transferred together with the pen ID 605 in a first information packet 610. The transfer takes place to a first computer 611, which receives and analyzes the information from the pen 604.

From a first database 614, there is retrieved, in the same way as in the previous examples, information about an allocation between the information in the first information packet 610 and an address of a second computer 619. The second computer 619 is in this example a service provider which uses the first computer 611 as a link to users' pens and which provides a service which gives users of pens the possibility of publishing on e.g., the Internet/www handwritten information, such as the information quantity 601.

In a first response 612, the first computer 611 then sends an address reference packet 613 to the pen 604. This address reference packet 613 comprises the allocation which was found with the aid of the first database 614 and thus contains information which the pen 604 can then use to make contact with the second computer 619. In addition, the first computer 611 now sends a charge signal 617 to the second computer 619, which means that the service provider which is in control of the second computer 619 is requested to pay for the use of the reference service which the first computer 611 has provided.

In a second transfer step 618, the pen 604 then transfers the first information packet 610 to the second computer 619. The second computer 619 analyzes the received information, after which it produces a data request 621 which is sent 620 to the pen 604. This data request simply comprises instructions for the pen 604 to produce a data packet with the marks on the position-coding pattern which have been made within a rectangle defined by corner coordinates 606, 607. The pen carries out this request and transfers in a transfer step 622 the quantity of marks 601 which comprises marks that have been made within the given rectangle 606, 607. The second computer 619 then processes this information so that the quantity of marks 601 can be provided, for instance, on a web page 625. This takes place in a manner known per se.

Figure 7:
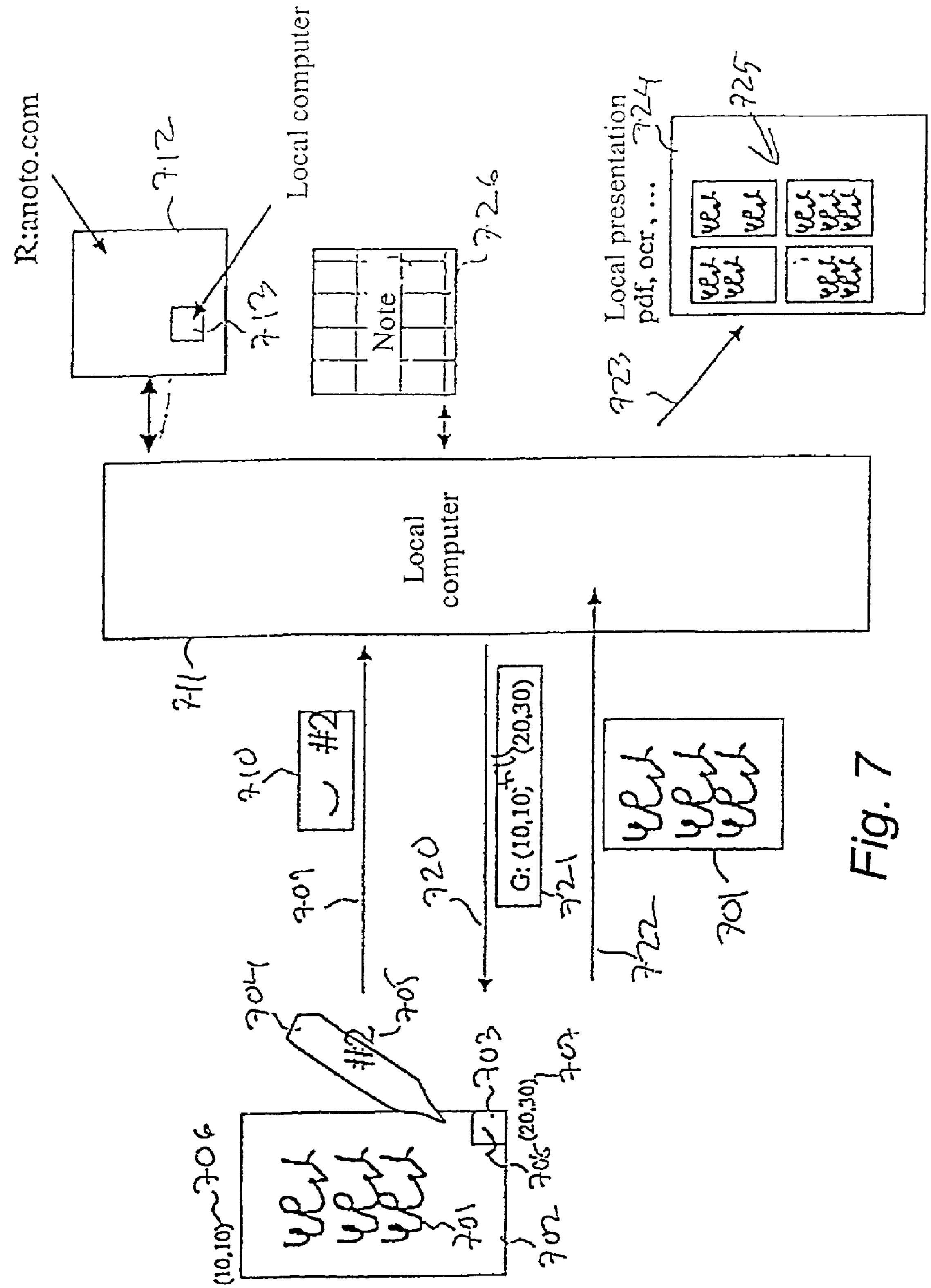
FIG. 7 is a schematic diagram illustrating an example of a second embodiment in which information exchange in the form of notes is carried out between units in an information managing system.

FIG. 7 shows an embodiment of an information transfer which uses an information managing system according to the invention. The Figure shows, like in the previous examples, on the one hand communicating units such as a pen 704 and a first computer 711 and, on the other hand, information and signals which are communicated between the units included in the system. A difference from the previous examples is that the communication between the units does not necessarily take place via a network, such as the Internet, but preferably takes place locally between a user's pen and a local personal computer.

A pen 704 with a pen ID 705 has been used to generate a message information quantity 701 within a first region 702. The generated quantity 701 has been stored in the pen 704 according to, for example, the methods described above in connection with the description of the pen. After the pen 704 has been used to make a send stroke 708 which crosses a border between the first area 702 and the send area or send box 703, a first transfer step 709 is carried out, in which this send stroke 708 is transferred together with the pen ID 705 in a first information packet 710. The transfer takes place to a first computer 711 in the form of a local personal computer, which receives and analyzes the information from the pen 704. The recipient of the send stroke and the information packet is determined by the part of the send region from which the send area is fetched. For instance the send region (whose first four bits are X=0001 and Y=0001) can be subdivided into two subregions, one for transmission to a predefined IP address where the above-mentioned computer or server is positioned and one for transmission to a local computer. For example, the fifth bit in the coordinate, i.e., the first bit in the send region, can define where the information packet is sent. If the fifth bit is (0,0), the packet is sent to a server. If the fifth bit is (1,1), the packet is sent to a local computer. The two other values (1,0) and (0,1) can be used for other purposes.

Like before, information about which message information quantity is to be transferred is retrieved from a first database 712 in the local computer. The computer 711 analyzes the received information, after which it produces a data request 721 which is sent 720 to the pen 704. This data request simply comprises instructions for the pen 704 to produce a data packet with the marks on the position-coding pattern that have been made within a rectangle defined by corner coordinates 706, 707. The pen executes this request and transfers in a transfer step 722 the quantity 701 which comprises marks that have been made in the given rectangle 706, 707. The computer 719 then processes this information so that the quantity 701 can be provided on, for example, a web page 725. This takes place in a manner known per se.

Figure 8:
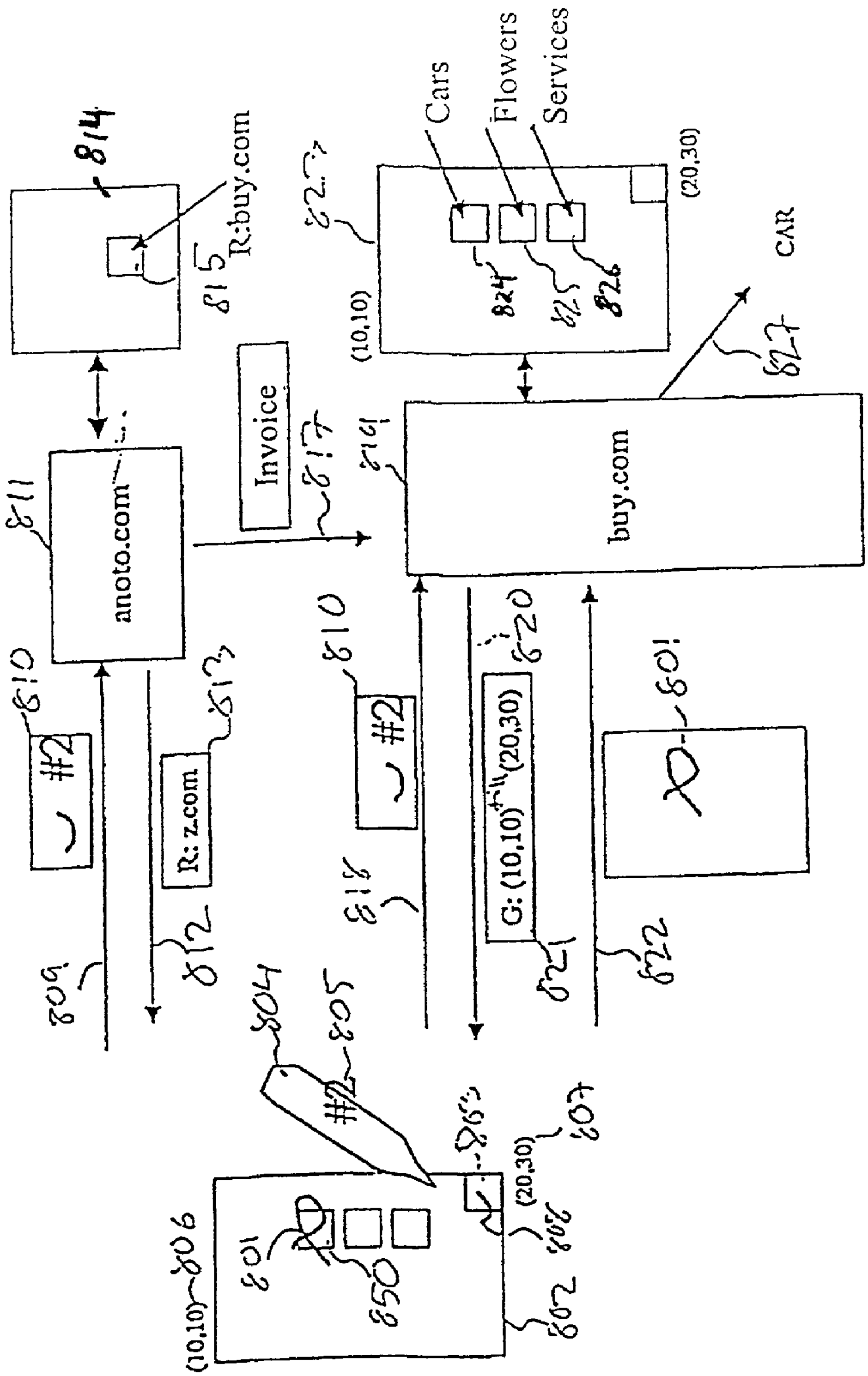
FIG. 8 is a schematic diagram illustrating an example of an embodiment in which information exchange in the form of an e-commerce order is carried out between units in an information managing system.

FIG. 8 shows an embodiment of an information transfer which uses an information managing system according to the invention. The Figure shows, like in the previous examples, on the one hand communicating units such as a pen 804 and a first computer 811 and, on the other hand, information and signals communicated between the units included in the system.

A pen 804 with a pen ID 805 has been used to generate a message information quantity 801 within a first region 802. The generated quantity 801 has been stored in the pen 804 according to, for instance, the methods described above in connection with the description of the pen. In contrast to the previous examples, the quantity 801 is in this example preferably a more or less cross-shaped stroke which has been made within a partial surface 850 within the first area 802. This partial surface 850 is part of an order form 823, as will be discussed further below, and is arranged on a box on a paper representation, for instance an advertisement, on which an absolute position-coding pattern is printed.

After the pen 804 has been used to make a send stroke 808 which crosses a border between the first area 802 and the send area 803, a first transfer step 809 is carried out, in which this send stroke 808 is transferred together with the pen ID 805 in a first information packet 810. The transfer takes place to a first computer 811, which receives and analyzes the information from the pen 804.

From a first database 804 there is retrieved, in the same way as in the previous examples, information about an allocation 815 between the information in the first information packet 810 and an address of a second computer 819. The second computer 819 is in this example a service provider which uses the first computer 811 as a link to users' pens and provides a service which gives users of pens the possibility of ordering products.

In a first response step 812, the first computer 811 then sends an address reference packet 813 to the pen 804. This address reference packet 813 comprises the allocation that was made with the aid of the first database 814 and thus contains information which the pen 804 can then use to make contact with the second computer 819. In addition, the first computer 811 now sends a charge signal 817 to the second computer 819, which means that the service provider which is in control of the second computer 819 is requested to pay for the use of the reference service provided by the first computer 811.

In a second transfer step 818, the pen then transfers the first information packet 810 to the second computer 819. The second computer 819 analyzes the received information, after which it produces a data request 821 which is sent 820 to the pen 804. This data request simply comprises instructions for the pen 804 to produce a data packet with the marks on the position-coding pattern that have been made within a rectangle defined by corner coordinates 806, 807. The pen executes this request and transfers in a transfer step 822 the quantity of marks 801 which comprises marks that have been made within the given rectangle 806, 807. The second computer 819 then processes this information so that the quantity 801 can be associated with an order form 823 and in particular be associated with an order for a certain product 824, 825, 826.

Figure 9:
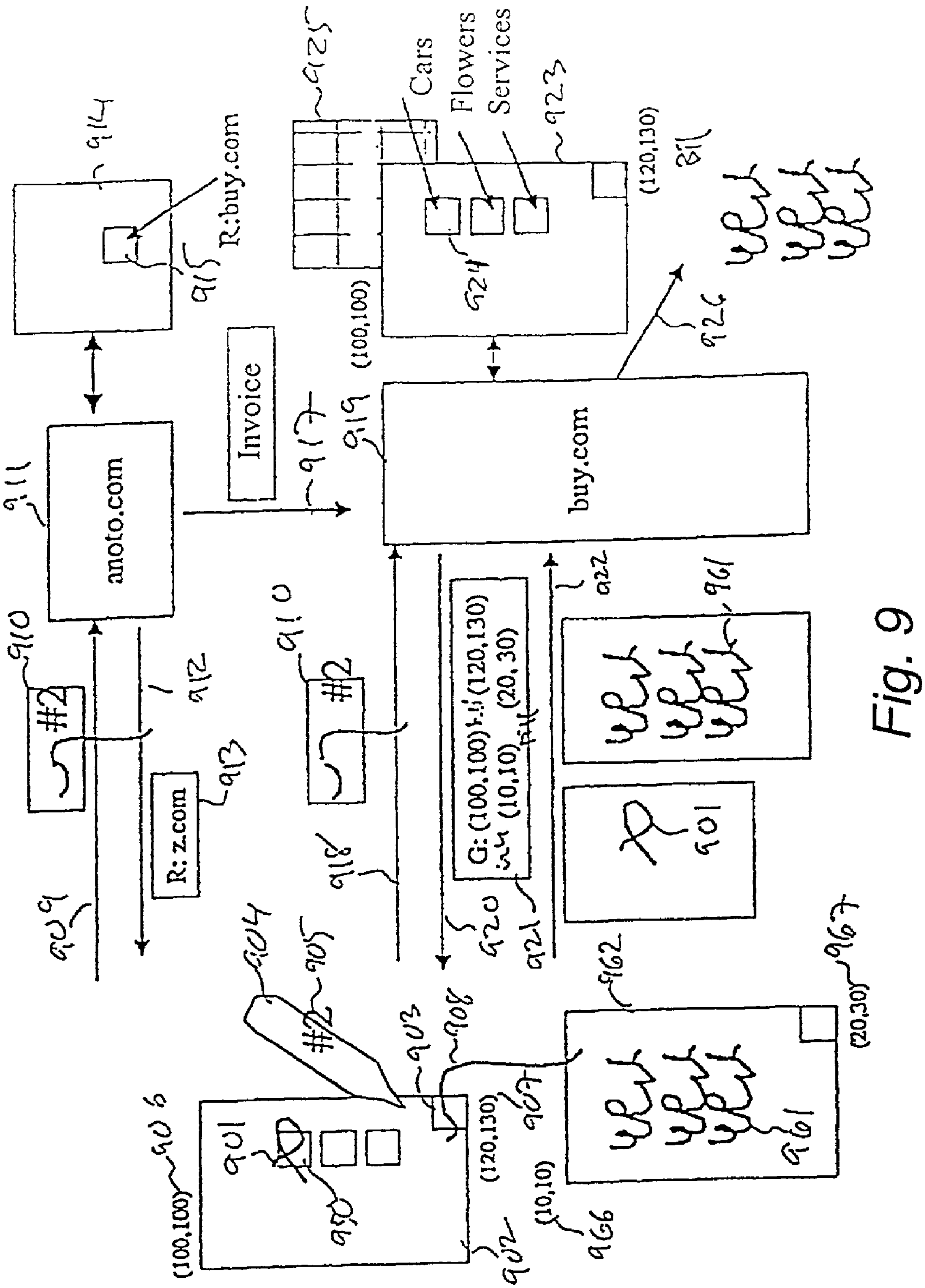
FIG. 9 is a schematic diagram illustrating an example of a second embodiment in which information exchange in the form of an e-commerce order is carried out between units in an information managing system.

FIG. 9 shows an embodiment of an information transfer which uses an information managing system according to the invention. The Figure shows, like in the previous examples, on the one hand communicating units such as a pen 904 and a first computer 911 and, on the other hand, information and signals which are communicated between the units included in the system.

A pen 904 with a pen ID 905 has been used to generate a message information quantity 901 within a first region 902. The generated quantity 901 has been stored in the pen 904 according to, for example, the methods described above in connection with the description of the pen. Like in the previous example that has been discussed in connection with FIG. 8, the quantity 901 is in this example preferably a more or less cross-shaped stroke which has been made within a partial surface 950 in the first area 902. The partial surface 950 is part of an order form 923, as will be discussed in more detail below, and is associated with a box on the paper representation, for example an advertisement, on which an absolute position-coding pattern is printed.

After the pen 904 has been used to make a send stroke 908, which crosses a border between a first area 902 and a send area 903, a first transfer step 909 is carried out, in which this send stroke 908 is transferred together with the pen ID 905 in a first information packet 910. The transfer takes place to a first computer 911, which receives and analyzes the information from the pen 904. In contrast to the previous examples, the send stroke 908 is more extended and crosses the border to one more area 962, in which a further message information quantity 961 has been recorded.

From a first database 914 there is retrieved, in the same way as in the previous examples, information about an allocation 915 between the information in the first information packet 910 and an address of a second computer 919. The second computer 919 is in this example a service provider which uses the first computer 911 as a link to users' pens and which provides a service which gives users of pens the possibility of ordering products.

In a first response step 912, the first computer 911 then sends an address reference packet 913 to the pen 904. This address reference packet 913 comprises the allocation that was made with the aid of the first database 914 and thus contains information which the pen 904 can then use to make contact with the second computer 919. In addition, the first computer 911 now sends a charge signal 917 to the second computer 919, which means that the service provider which is in control of the second computer 919 is requested to pay for the use of the reference service provided by the first computer 911.

In a second transfer step 918, the pen 904 then transfers the first information packet 910 to the second computer 919. The second computer 919 analyzes the received information, after which it produces a data request 921 which is sent 920 to the pen 904. This data request simply comprises instructions for the pen 904 to produce a data packet with the marks on the position-coding pattern that have been made within a rectangle defined by corner coordinates 906, 907 for the first region 902 and corner coordinates 966, 967 for the additional region 962. The pen carries out this request and transfers in a transfer step 922 the quantity of marks 901 which contains marks that have been made within the given rectangles 906, 907, 966, 967 for the respective first and additional areas 902, 962. The second computer 919 then processes this information so that the first quantity of marks 906 can be associated with an order form 923 and in particular be associated with an order for a certain product 924, 925, 926.

Allocation is a term that has been described above in connection with FIGS. 3A–3B. In the above examples, allocation is used to indicate which regions and areas are to be comprised by the transmission. A hyperline or a hypertrace was formed, comprising coordinates from a plurality of different regions in the same stroke. As indicated above the pen comprises a pressure sensor which detects when the pen is in contact with a base and a stroke or a trace is formed.

A single stroke or a single trace thus comprises coordinates from several regions. This trace starts or ends in a send box. The send box indicates to the pen that a send function is to be begun and the program of the send function includes coordinates from each region, which are included in the hyperline. Coordinates from the send box indicate that the pen is to start a send function to a specific IP address where a server is located, which contains a database of the various subscribers to the system, each defined by coordinates of the send box. Coordinates from the other regions indicate to an application in the receiving computer what this should execute.

A hyperline can be used on other occasions than in connection with a send stroke. Thus, a hyperline can be used to qualify a certain type of information.

One example is that a user's notes on a notepad sheet is to be sent as an e-mail to a recipient. The user has a business card received from the recipient with the recipient's personal pattern on the back. Instead of writing an e-mail address, the user places the business card on the notepad sheet and draws a stroke from the business card to the notepad sheet so that the hyperline records coordinates from both areas. When the information then is to be analyzed by an e-mail program which is to send the information, the e-mail program looks for a hyperline which could supply information about the e-mail address and then finds this hyperline. The program sends a request to an IP server asking to whom the pattern of the business card belongs, and then receives the recipient's e-mail address. Of course, a plurality of notepad sheets can be linked to a hyperline, for example by a hyperline being drawn over both pages, or several juxtaposed pages.

It will be appreciated that the user can have predefined a number of e-mail addresses in special personal areas in his own private area, so that a hyperline from such a predefined area implies that the program looks in a specific database for the preprogrammed e-mail address. Of course, the pen ID can also be used as personal information, for instance that the information is to be sent as a copy to the pen holder's e-mail address.

The user can also have preprogrammed other functions which by means of a hyperline can be associated with information in different ways. A user may have stored all his previous notes in a private computer, and wants to find a certain page. He has retained a small part of this page and places it next to a function area, which he has previously predefined with a search function. A hyperline between the function area and said part establishes an allocation between the function area and the notepad page. The function area activates a search program which easily locates the notepad page by means of coordinates on said part and shows this page on the computer display. This search function can be extended to find information stored in a server somewhere on the Internet, i.e., information floating in cyberspace.

One more example of search functions is as follows: In an article by a certain author a reference list is given at the end, where each reference is coded with a coding pattern according to the invention. By drawing a hyperline between the user's business card pattern and the reference's coding pattern, an allocation is established, which can result in the article being sent to the user via e-mail. By indicating a coding pattern next to each author, a hyperline as described above may comprise sending of predetermined information about the author to the business card holder.

An allocation can be generated between more than two regions, as indicated above for e-commerce. Thus, a send request may comprise a send box from a send region, one or more notepad sheets from a notice region, a piece of personal information from a business card region, a piece of pay information from a pay region.

Allocation can also be used to qualify the information that is to be sent. If a hyperline passes through a secrecy area, it means that the pen, when analyzing the send stroke, notes that the information that is sent is first to be encrypted according to a predefined algorithm. Other functions can also be qualified with hyperlines, such as that the information is to be subjected to optical character recognition (optical character recognition is in the present patent application understood to be all forms of interpretation of graphical information into character-based information). The allocation can already be interpreted by the pen or by the program which manages the information forwarded by the pen. If the allocation is interpreted by the pen, it can be used to reset the pen between different function modes, such as the above-mentioned encryption.

The foregoing embodiments merely illustrate the principles of the present invention. It will be appreciated that those skilled in the art will be able to devise various arrangements which, although not explicitly described or shown herein, do not depart from the spirit and scope of the present invention.

What is claimed is:

1. A method of managing information input via a sensor device and a position-coding pattern printed on a product, comprising:

reading coordinates of said sensor device based on movement of said sensor device relative to said position-coding pattern, said position-coding pattern including marks that code coordinates on a reference surface, said reference surface including position-coding pattern portions that are used to create a plurality of product types, said position-coding pattern printed on said product including at least a first sub-pattern portion and a second sub-pattern portion; and executing an information management function based on coordinates read from said first sub-pattern portion, said information management function managing information formed by coordinates read from said second sub-pattern portion, wherein said sensor device determines a characteristic of at least one of said first sub-pattern portion and said second sub-pattern portion based on at least one coordinate read from said product and definition data stored in a memory of said sensor device, wherein coordinates read from said product define multiple bit codes and said sensor device determines a local coordinate within said second sub-pattern portion based on said definition data and at least a portion of a multiple bit code.

2. A method as claimed in claim 1, wherein said information management function is one of: storing information, sending information, and converting information.

3. A method as claimed in claim 1, wherein said information management function is a send function by which said sensor device sends at least part of coordinates from a send area of said first sub-pattern portion to a database device which allocates a particular send address to said send area, which is used to send said information to a recipient.

4. A method as claimed in claim 3, wherein said send address is communicated to said sensor device, which sends a request to a computer device defined by said send address to execute a program in said computer device.

5. A method as claimed in claim 4, wherein said program analyzes coordinates read from said second sub-pattern portion and sends a request to said sensor device to transfer said information, the program generating a message according to said information.

6. A method as claimed in claim 5, wherein said program generates an e-mail which is sent to a recipient.

7. A method as claimed in claim 6, wherein the e-mail address for said recipient is included in said information.

8. A method as claimed in claim 5, wherein said program generates a function for performing an electronic commerce service.

9. A method as claimed in claim 1, wherein said reference surface comprises at least one of a send region, a note region, a general region, an application domain region, a private region and a direct-managed region.

10. A method as claimed in claim 1, wherein said definition data defines the extent of each of a plurality of addressable sub-pattern units in said reference surface.

11. A method as claimed in claim 1, wherein each of said coordinates defines a multiple bit code, and wherein said definition data identifies a section of said multiple bit code as being indicative of an addressable sub-pattern unit.

12. A method as claimed in claim 1, wherein said sensor device forms said information from said coordinates read from said second sub-pattern portion.

13. A method as claimed in claim 1, wherein said sensor device forms said information in local coordinates within said second sub-pattern portion.

14. A method as claimed in claim 13, wherein each of said coordinates defines a multiple bit code, each of said local coordinates being formed based upon a predetermined part of said multiple bit code.

15. A method as claimed in claim 1, wherein said sensor device identifies said information management function based upon said definition data.

16. A method as claimed in claim 1, wherein said definition data defines the extent of said first sub-pattern portion.

17. A method as claimed in claim 1, wherein each of said coordinates defines a multiple bit code, wherein said definition data associates one part of said multiple bit code with said first sub-pattern portion.

18. A method as claimed in claim 17, wherein said definition data associates another part of said multiple bit code with an area within said first sub-pattern portion, said area being indicative of said information management function.

19. A system for managing information, comprising:

a sensor device which comprises a coordinate reader for reading coordinates of said sensor device based on movement of said sensor device relative to a position-coding pattern printed on a product, said position-coding pattern including marks that code coordinates on a reference surface, said reference surface including position-coding pattern portions that are used to create a plurality of product types, said position-coding pattern printed on said product including at least a first sub-pattern portion and a second sub-pattern portion; and a memory storing definition data; and an information manager for executing an information management function based on coordinates read from said first sub-pattern portion, said information management function managing information formed by coordinates read from said second sub-pattern portion;

wherein said sensor device determines a characteristic of at least one of said first sub-pattern portion and said second sub-pattern portion based on at least one coordinate read from said product and said definition data stored in said memory, wherein coordinates read from said product define multiple bit codes and said sensor device determines a local coordinate within said second sub-pattern portion based on said definition data and at least a portion of a multiple bit code.

20. A system as claimed in claim 19, wherein said information management function executed by said information manager is one of: storing information, sending information, and converting information.

21. A system as claimed in claim 19, wherein said information management function executed by said information manager is a send function which enables said sensor device to send at least part of coordinates from a send area of said first sub-pattern portion to a database device which allocates a particular send address to said send area, which is used to send said information to a recipient.

22. A system as claimed in claim 21, wherein said send address is communicated to said sensor device, which sends a request to a computer device defined by said send address to execute a program in said computer device.

23. A system as claimed in claim 22, wherein said program analyzes coordinates read from said second sub-pattern portion and sends a request to said sensor device to transfer said information, the program generating a message according to said information.

24. A system as claimed in claim 23, wherein said program generates an e-mail which is sent to a recipient.

25. A system as claimed in claim 24, wherein the e-mail address for said recipient is included in said information.

26. A system as claimed in claim 23, wherein said program generates a function for performing an electronic commerce service.

27. A system as claimed in claim 19, wherein said reference surface comprises at least one of a send region, a note region, a general region, an application domain region, a private region and a direct-managed region.

28. A system as claimed in claim 19, wherein said definition data defines the extent of each of a plurality of addressable sub-pattern units in said reference surface.

29. A system as claimed in claim 19, wherein each of said coordinates defines a multiple bit code, and wherein said definition data identifies a section of said multiple bit code as being indicative of an addressable sub-pattern unit.

30. A system as claimed in claim 19, wherein said sensor device forms said information from said coordinates read from said second sub-pattern portion.

31. A system as claimed in claim 19, wherein said sensor device forms said information in local coordinates within said second sub-pattern portion.

32. A system as claimed in claim 31, wherein each of said coordinates defines a multiple bit code, each of said local coordinates being formed based upon a predetermined part of said multiple bit code.

33. A system as claimed in claim 19, wherein said sensor device identifies said information management function based upon said definition data.

34. A system as claimed in claim 19, wherein said definition data defines the extent of said first sub-pattern portion.

35. A system as claimed in claim 19, wherein each of said coordinates defines a multiple bit code, wherein said definition data associates one part of said multiple bit code with said first sub-pattern portion.

36. A system as claimed in claim 35, wherein said definition data associates another part of said multiple bit code with an area within said first sub-pattern portion, said area being indicative of said information management function.

* * * * *